United States Patent
Tulachan et al.

(10) Patent No.: US 12,388,105 B2
(45) Date of Patent: *Aug. 12, 2025

(54) EUTECTIC ELECTROLYTE FOR THE ZINC BASED RECHARGEABLE REDOX STATIC ENERGY STORAGE DEVICES

(71) Applicants: Offgrid Energy Labs Inc, San Francisco, CA (US); Offgrid Energy Labs Private Limited, New Delhi (IN)

(72) Inventors: Brindan Tulachan, Kanpur (IN); Aasiya Bano Shaikh, Nashik (IN); Sumanta Chakrabarty, West Bengal (IN)

(73) Assignees: Offgrid Energy Labs Inc, San Francisco, CA (US); Offgrid Energy Labs Private Limited, New Delhi (IN)

( * ) Notice: Subject to any disclaimer, the term of this patent is extended or adjusted under 35 U.S.C. 154(b) by 411 days.

This patent is subject to a terminal disclaimer.

(21) Appl. No.: 17/801,176

(22) PCT Filed: Jun. 21, 2021

(86) PCT No.: PCT/IN2021/050598
§ 371 (c)(1),
(2) Date: Aug. 19, 2022

(87) PCT Pub. No.: WO2021/260724
PCT Pub. Date: Dec. 30, 2021

(65) Prior Publication Data
US 2023/0144715 A1    May 11, 2023

(30) Foreign Application Priority Data
Jun. 22, 2020 (IN) .............. 202011026183

(51) Int. Cl.
*H01M 10/02* (2006.01)

(52) U.S. Cl.
CPC .... *H01M 10/02* (2013.01); *H01M 2300/0005* (2013.01)

(58) Field of Classification Search
CPC ....... H01M 10/02; H01M 10/25–0569; H01M 2300/0005
See application file for complete search history.

(56) References Cited

U.S. PATENT DOCUMENTS

2017/0194666 A1*  7/2017  Adamson ............ H01M 10/056
2023/0051504 A1*  2/2023  Accogli ............ H01M 10/0562

FOREIGN PATENT DOCUMENTS

| CN | 108950091 B | * 12/2021 | ............ C13B 10/14 |
| WO | 2017201124 | 11/2017 | |

OTHER PUBLICATIONS

CN108950091B. Dec. 3, 2021. English machine translation by EPO. (Year: 2021).*

(Continued)

*Primary Examiner* — James Lee

(57) ABSTRACT

An electrolyte is provided for the zinc based rechargeable redox static energy storage devices, the electrolyte comprising one or more inorganic transition metal salt(s) of zinc; one or more Metal hydroxide(s); a eutectic solvent comprising one or more derivative(s) of methanesulfonic acid selected from its salts, one or more ammonium salt(s) one or more hydrogen bond donor(s). The electrolyte is thermally and chemically stable and has pH ranging from 5 to 7, and therefore does not facilitate evolution of hydrogen and oxygen during its application.

4 Claims, 3 Drawing Sheets

(56) References Cited

OTHER PUBLICATIONS

Aroa R. Mainar et al., "Alkaline aqueous electrolytes for secondary zinc-air batteries: an overview", International journal of energy research, DOI: 10.1002/er.3499, published Feb. 5, 2016.

Chunlin Xie et al., "Issues and solutions toward zinc anode in aqueous zinc-ion batteries: A mini review", Carbon Energy. 2020, 2:540-560, DOI: 10.1002/cey2.67, published Aug. 10, 2020.

Aroa R. Mainar et al., "A brief overview of secondary zinc anode development: The key of improving zinc-based energy storage systems", International journal of energy research, DOI: 10.1002/er.3822, published Jul. 28, 2017.

Junxiong Wu et al., "Deep Eutectic Solvents for Boosting Electrochemical Energy Storage and Conversion: A Review and Perspective", Advanced Functional Materials, DOI: 10.1002/adfm.202011102, published 2021.

Yaojian Zhang et. al., "Pursuit of reversible Zn electrochemistry: a time honored challenge towards low-cost and green energy storage", NPG Asia Materials (2020), https://doi.org/10.1038/s41427-019-0167-1, published Jan. 24, 2020.

International Search Report and Written Opinion of the International Searching Authority from corresponding Patent Cooperation Treaty (PCT) Application No. PCT/IN2021050598, indicated completed on Sep. 20, 2021.

Smith, E.L., Abbot A.P., & Ryder, K.S. Deep Eutectic Solvents (DESs) and Their Applications. Chemical Reviews, Oct. 10, 2014, pp. 11060-11082.

Mainar, A.R., Iruin, E., Colmenares, L. C., Kvasha, A., De Meatza, I. Bengoechea, M., Blazquez, J.A. An overview of progress in electrolytes for secondary zinc-air batteries and other storage systems based on zinc. Journal of Energy Storage, Jan. 1, 2018, Table 1, Fig 1, p. 306.

\* cited by examiner

EUTECTIC ELECTROLYTE FOR THE ZINC BASED RECHARGEABLE REDOX STATIC ENERGY STORAGE DEVICES

CROSS REFERENCE TO RELATED APPLCATIONS

The present application is a § 371 national stage of International Application PCT/IN2021/050598, filed Jun. 21, 2021, which claims priority benefit of India Pat. Application Ser. No. 202011026183, filed Jun. 22, 2020, both of which are hereby incorporated herein by reference in their entireties.

FIELD OF INVENTION

The present invention generally relates to a novel electrolyte for the electrochemical energy storage devices and more particularly to a eutectic solvent-based electrolyte for zinc-based rechargeable redox static energy storage devices and the process involved in preparing the same.

BACKGROUND OF INVENTION

Continuous utilization of fossil fuels and rising concerns about its adverse effects on global climate has shifted the focus of the research community towards the green renewable energy generation methods like solar, wind, tidal and geothermal energy. In order to exploit these sustainable energy resources, there is a demand for highly efficient, low cost, durable and eco-friendly rechargeable energy storage system with high energy and power density. This has increased the demand for advanced energy storage technologies in not only large-scale energy storage grid applications but also in the electric vehicle sector.

Today's market of rechargeable energy storage devices is being dominated by lithium-ion energy storage and lead-acid energy storage devices. Although there is a significant development in the lithium-ion energy storage and the lead-acid energy storage technology, still lithium-ion devices suffer from safety issues with their flammable organic electrolytes and raise concern regarding the high price and availability of lithium resources which hinders their large-scale applications while on the other hand lead-acid energy storage devices suffer from low energy density, poor cyclic life and chemical toxicity of lead. These issues present with the existing rechargeable energy storage devices have led the research beyond these existing rechargeable energy storage devices.

So far, a variety of energy storage device chemistries involving metal ions of Na, K, Mg and Zn has been investigated as a possible alternative to the currently existing energy storage device technologies. Out of this Zn based energy storage devices are considered as a promising alternative candidate for large scale grid applications due to their low cost, eco-friendliness, high safety, material abundance and ease of manufacturing. Metallic zinc anodes offer high theoretical capacity (820 mAh/g), electrochemical stability, reaction reversibility and balanced electrochemical kinetics of zinc ion in the aqueous medium, low electrochemical potential −0.76 V with respect to the standard hydrogen electrode, two-electron transfer redox reaction leading to high energy density, high abundance, low toxicity and safe electrochemical operation due to aqueous nature.

However, existing Zn based energy storage devices use aqueous electrolyte, which limits choices of cathode materials and also lead to the narrow potential range. The conventional aqueous electrolyte (alkaline/acidic) used in Zn based energy storage devices has inherent problems resulting into capacity fading and poor cyclic result. Further water evaporation causes dryness of electrodes resulting into faster capacity fading.

Various review articles such as "Alkaline aqueous electrolytes for secondary zinc—air batteries: an overview" by Aroa R. Mainar et. al., published by International journal of energy research, DOI: 10.1002/er.3499; "Issues and solutions toward zinc anode in aqueous zinc-ion batteries: A mini review" by Chunlin Xie et. al. published at Carbon Energy. 2020, 2:540-560, DOI: 10.1002/cey2.67; "Pursuit of reversible Zn electrochemistry: a time honored challenge towards low-cost and green energy storage" by Yaojian Zhang et. al., published at NPG Asia Materials (2020), https:/doi.org/10.1038/s41427-019-0167-1; "A brief overview of secondary zinc anode development: The key of improving zinc-based energy storage systems" by Aroa R. Mainar et. al. published by International journal of energy research, DOI: 10.1002/er.3822 discusses various problems and limitations present in the existing electrolytes.

Alkaline electrolytes facilitate in formation of irreversible products like zinc oxide and hydroxide which further causes formation of dendrites causing capacity fading, poor cyclic ability, poor efficiencies, and chances of short circuit. The existing alkaline electrolytes used in Zinc based Energy storage devices have pH above 10.

Acidic electrolytes facilitate in evolution of gases containing hydrogen and oxygen leading to pitting of electrodes, poor cyclic ability, capacity fading, and poor coulombic efficiencies. Further, the gases evolve also increases internal pressure and may lead to explosion. The existing acidic electrolytes used in Zinc based Energy storage devices have pH generally below 3. However, few developments have shown electrolyte having pH around 4.2, however the evolution of gases like hydrogen and oxygen still persists. Further change of electrolyte pH during cycling causes pitting of electrodes leading to the short circuit in the device.

With the use of conventional metal salt-containing aqueous electrolyte in the zinc-based energy storage device, the desired outcome is difficult to achieve in both thermodynamical and electrochemical aspect.

To overcome these issues related to existing aqueous electrolytes, researchers have investigated eutectic solvent (ES) based electrolytes also popularly known as Deep Eutectic Solvent (DES) based electrolytes as a possible alternative.

The eutectic solvent is formed by hydrogen bonding among two or three of its constituting components, and the resulting mixture has a melting point much lower than that of individual components.

In review report titled as "Deep Eutectic Solvents for Boosting Electrochemical Energy Storage and Conversion: A Review and Perspective" by Junxiong Wu et. al. published by Advanced Functional Materials, DOI: 10.1002/adfm.202011102 has mentioned various deep eutectic solvents for boosting electrochemical energy storage and conversion. However, these electrolytes still contain a significant amount of water favoring the formation of irreversible by-products at the cathode side. Also, in most of the cases, hydrogen evolution is observed, which builds up the internal pressure, eventually leading to the failure of the energy storage device. Further, water evaporation may cause drying of electrolyte during cycling, and utilization of surfactant and heterocyclic compounds may interfere with the electrochemical reactions and hence lowering the overall efficiency. In addition, existing eutectic electrolyte has many other disadvantages like high viscosity, low conductivity, etc.

Hence there is a need for a suitable electrolyte which is thermally and chemically stable, with enhanced shelf life and overcomes the problems present with existing aqueous as well as the eutectic electrolyte for zinc-based rechargeable energy storage devices.

SUMMARY OF INVENTION

The present invention discloses an eutectic electrolyte for the zinc based rechargeable redox static energy storage devices which has answers to the limitations of the existing eutectic electrolytes.

The eutectic electrolyte for the zinc based rechargeable redox static energy storage devices according to the present invention comprises one or more inorganic transition metal salt(s) of zinc selected from a group consisting of Zinc Chloride, Zinc Acetate, Zinc Methanesulfonate, Zinc Sulphate, Zinc triflate; one or more salt(s) of metal(s) selected from a group consisting of manganese, nickel titanium and copper metal with sulphate anions, methane sulfonate anions, halides anions including chloride, bromide, organic salts of transition metal ions with anions like acetate, oxalates, formates, phosphinates, lactate, malate, citrate, benzoate and ascorbate; one or more Metal hydroxide(s) selected from a group consisting of sodium hydroxide, potassium hydroxide, aluminum hydroxide, zinc hydroxide, calcium hydroxide, cesium hydroxide, magnesium hydroxide, iron hydroxide; wherein one or more inorganic transition metal salt(s) of zinc, one or more salt(s) of metal(s) and one or more Metal hydroxide(s) in molar concentration range 0.1-3:0.1-3:0.05-1 are mixed to a eutectic solvent comprising one or more derivative(s) of methanesulfonic acid selected from its salts with various metal ions selected from a group consisting of manganese, zinc, cerium, nickel, titanium, copper, sodium, potassium and calcium; one or more ammonium salt(s) having general formula $NH_4X$, where X can be selected from a group consisting of chloride, methanesulfonate, acetate, sulphate, triflate, trimethanesulfonate; one or more hydrogen bond donor(s) selected from a group consisting of urea, thiourea, glycerol, oxalic acid, acetic acid, ethylene glycol, acetamide, benzamide, adipic acid, benzoic acid, citric acid; wherein the molar ratio of derivative(s) of methanesulfonic acid, ammonium salt(s) and hydrogen bond donor(s) is in the range 0.5-3:2-7:8-13.

The eutectic electrolyte for the zinc based rechargeable redox static energy storage devices has pH ranging from 5 to 7 hence does not facilitate evolution of hydrogen and oxygen during its application.

These and other objects, advantages and features of the invention will become apparent upon review of the following specification in conjunction with the drawings.

DETAILED DESCRIPTION OF DRAWINGS

I. Definitions

Figure 1:
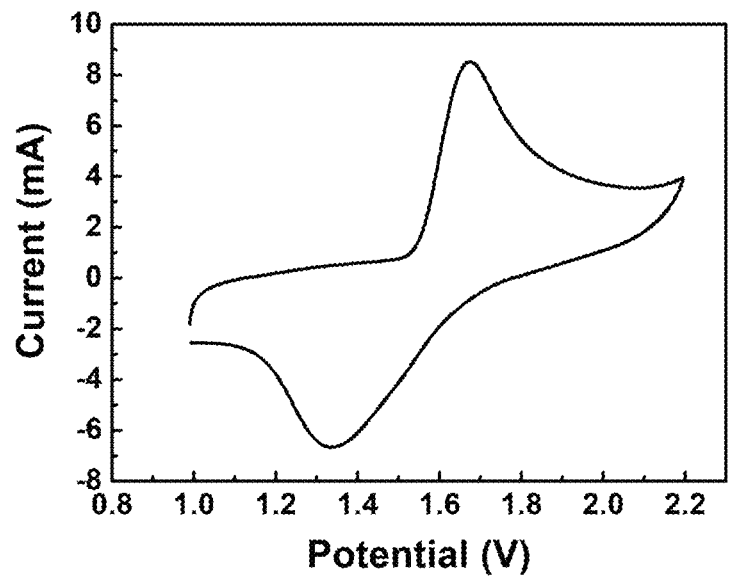
FIG. 1: Displays the cyclic voltammetry curve of eutectic electrolyte of Example 1 on a full cell carbon/carbon symmetrical cell at a scan rate of 5 mV/s. A pair of well-defined peaks could be observed at a potential range of 1-2.2V.

For purposes of interpreting the specification and appended claims, the following terms shall be given the meaning set forth below:

The term "static energy storage device" shall mean an energy storage device with physically non-flowing or non-moving electrolyte or cathode electrode or anode electrode materials.

The term "solvent" shall refer to a liquid medium capable of dissolving other substance(s).

The term "ambient temperature" shall mean temperature falling in the range of 25 to 30° C.

The term "ambient pressure" shall mean atmospheric pressure at 1 bar.

The term "eutectic electrolyte" shall mean electrolyte solution that comprises ions, but does not use water as the solvent. The electrolyte is formed by a mixture of eutectic solvent-based electrolytes. It contains eutectic solvent and ions, atoms or molecules that have lost or gained electrons, and is electrically conductive.

When referring to the concentration of components or ingredients for eutectic electrolytes, Mols shall be based on the total volume of the eutectic electrolyte.

II. Description

Reference is hereby made in detail to various embodiments according to present invention, examples of which are illustrated in the accompanying drawings and described below. It will be understood that invention according to present description is not intended to be limited to those exemplary embodiments. The present invention is intended to cover various alternatives, modifications, equivalents and other embodiments, which may be included within the spirit and scope of the invention as defined by the claims.

The present invention discloses an eutectic electrolyte for the zinc based rechargeable redox static energy storage devices comprising one or more inorganic transition metal salt(s) of zinc selected from a group consisting of Zinc Chloride, Zinc Acetate, Zinc Methanesulfonate, Zinc Sulphate, Zinc triflate; one or more salt(s) of metal(s) selected from a group consisting of manganese, nickel titanium and copper metal with sulphate anions, methane sulfonate anions, halides anions including chloride, bromide, organic salts of transition metal ions with anions like acetate, oxalates, formates, phosphinates, lactate, malate, citrate, benzoate, ascorbate; one or more Metal hydroxide(s) selected from a group consisting of sodium hydroxide, potassium hydroxide, aluminum hydroxide, zinc hydroxide, calcium hydroxide, cesium hydroxide, magnesium hydroxide, iron hydroxide; wherein one or more inorganic transition metal salt(s) of zinc, one or more salt(s) of metal(s) and one or more Metal hydroxide(s) in molar concentration range 0.1-3:0.1-3:0.05-1 are mixed to a eutectic solvent comprising one or more derivative(s) of methanesulfonic acid selected from its salts with various metal ions selected from group consisting of manganese, zinc, cerium, nickel, titanium, copper, sodium, potassium and calcium; one or more ammonium salt(s) having general formula $NH_4X$, where X can be selected from a group consisting of chloride, methanesulfonate, acetate, sulphate, triflate, trimethanesulfonate; one or more hydrogen bond donor(s) selected from a group consisting of urea, thiourea, glycerol, oxalic acid, acetic acid, ethylene glycol, acetamide, benzamide, adipic acid, benzoic acid, citric acid; wherein the molar ratio of derivative(s) of methanesulfonic acid, ammonium salt(s) and hydrogen bond donor(s) is in the range 0.5-3:2-7:8-13.

The eutectic electrolytes disclosed in the present invention has pH ranging between 5 to 7 i.e. near neutral. Compounds like Zinc Hydroxide are generally insoluble in existing electrolytes. In order to dissolve metal hydroxide(s) of metals like zinc, potassium, calcium, lithium, sodium in the pH of the existing solvents needs to be increased to bring the same in pH range −1 to 3 by adding acids to the same, which makes the resulting electrolyte acidic. However, the eutectic electrolyte of the present invention dissolving compounds like Zinc Hydroxide at pH ranging 5 to 7. Due to its near neutral character the eutectic electrolyte does not facilitate evolution of hydrogen.

The eutectic electrolyte according to the present invention is prepared as under:

The eutectic solvent is prepared by mixing one or more derivative(s) of methanesulfonic acid selected from its salts with various metal ions selected from a group consisting of manganese, zinc, cerium, nickel, titanium, copper, sodium, potassium and calcium; one or more ammonium salt(s) having general formula $NH_4X$, where X can be selected from a group consisting of chloride, methanesulfonate, acetate, sulphate, triflate, trimethanesulfonate; one or more hydrogen bond donor(s) selected from a group consisting of urea, thiourea, glycerol, oxalic acid, acetic acid, ethylene glycol, acetamide, benzamide, adipic acid, benzoic acid, citric acid; wherein the molar ratio of derivative(s) of methanesulfonic acid, ammonium salt(s) and hydrogen bond donor(s) is in the range 0.5-3:2-7:8-13 are mixed. Upon proper mixing, the mixture starts converting into a liquid at ambient temperature and pressure. To ensure the proper mixing of the components and to speed up the process, this mixture may be uniformly heated at a temperature up to 60° C.

One or more inorganic transition metal salt(s) of zinc selected from a group consisting of Zinc Chloride, Zinc Acetate, Zinc Methanesulfonate, Zinc Sulphate, Zinc triflate; one or more salt(s) of metal(s) selected from a group consisting of manganese, nickel, titanium and copper metal with sulphate anions, methane sulfonate anions, halides anions including chloride, bromide, organic salts of transition metal ions with anions like acetate, oxalates, formates, phosphinates, lactate, malate, citrate, benzoate, ascorbate; one or more Metal hydroxide(s) selected from a group consisting of sodium hydroxide, potassium hydroxide, aluminum hydroxide, zinc hydroxide, calcium hydroxide, cesium hydroxide, magnesium hydroxide, iron hydroxide; wherein one or more inorganic transition metal salt(s) of zinc, one or more salt(s) of metal(s) and one or more Metal hydroxide(s) in molar concentration range 0.1-3:0.1-3:0.05-1 are added to the eutectic solvent and are continuously mixed until they are completely dissolved in the solvent resulting in eutectic electrolyte.

III. Examples

The following illustrative examples are provided to further describe how to make and use the preferred eutectic electrolyte compositions according to present invention. The same are not intended to limit the scope of the claimed invention.

Example 1

In the process of preparing the eutectic electrolyte for the zinc based rechargeable redox static energy storage devices, Eutectic solvent is produced by mixing 2 Moles of Calcium methanesulfonate, 5 Moles of Ammonium Chloride and 10 Moles of Thiourea in a rotary round-bottom flask at 60° C. in an oil bath and rotated for about 45 minutes to obtain a clear, colorless liquid. Then the solvent is added to a glass bottle. The bottle is placed on a magnetic stirrer plate. Manganese Chloride, Zinc Chloride and Zinc Hydroxide in the molar ratio 1:1:0.4 are slowly added to the prepared eutectic solvent under continued stirring. The electrolyte mixture is stirred until all the salts are dissolved. The eutectic electrolyte mixture is then removed from the stirrer plate and stored in a glass bottle.

Example 2

In the process of preparing the eutectic electrolyte for the zinc based rechargeable redox static energy storage devices, Eutectic solvent is produced by mixing 2 Moles of Calcium methanesulfonate, 5 Moles of Ammonium Chloride and 10 Moles of Thiourea in a rotary round-bottom flask at 60° C. in an oil bath and rotated for about 45 minutes to obtain a clear, colorless liquid. Then the solvent is added to a glass bottle. The bottle is placed on a magnetic stirrer plate. Manganese Acetate, Zinc Acetate and Potassium hydroxide in the molar ratio 1:1:0.1 are slowly added to the prepared eutectic solvent under continued stirring. The eutectic electrolyte mixture is stirred until all the salts are dissolved. The electrolyte mixture is then removed from the stirrer plate and stored in a glass bottle.

IV. Experimentation

Eutectic Electrolyte Testing:

The cyclic voltammetry (CV) tests of the carbon/carbon symmetrical cells using different eutectic electrolytes are conducted on a BioLogic VPM3 electrochemical workstation at a scanning rate of 5 mV s-1.

Ionic conductivity measurements are made with an 5230 Bench Conductivity Meter (Mettler-Toledo GmbH). The instrument is calibrated before each experimental temperature vs. a standard KCl solution.

All the viscosity of eutectic electrolytes of Example 1 & 2 are tested using an Dv2t Brookfield Viscometer.

For both the cases temperature are controlled within ±0.5° C. using a thermo-static, water bath.

Cell Fabrication:

Carbon-based active material, separator, eutectic electrolyte, and zinc metal foil are the significant components for the fabrication of the cells for testing.

The cathode is prepared by coating electrode slurry on a graphite foil serving as a current collector. The electrode slurry is formed by mixing conductive acetylene black and binder in a weight ratio of 85:15 in N-methyl-2-pyrrolidone (NMP) solvent via gentle stirring. AB 50 carbon from Polymax and Poly-vinylidene fluoride (PVDF) are used as a conductive agent and binder, respectively. The cathode coating is dried at 100° C. for 3 hours to evaporate the solvent. This is followed by calendaring the cathode film using TOB-SG-100L lab roll press machine to maintain uniform thickness. Highly pure Zinc metal foil (99.95%) is used as a counter electrode (i.e. anode). Anode electrode and cathode electrode are separated by an absorptive glass mat (AGM) separator having a thickness of 200 micrometer and soaked in electrolytes of Examples 1 and 2 for two different cells respectively.

For the voltage-time profiles of the Zn/Zn symmetric CR 2032 coin-type cells are obtained. The Zn/Zn symmetric cells are composed of a Zn working electrode (diameter: 10 mm) and a Zn counter/reference electrode (diameter: 12 mm) with a disc shape. The AGM membrane is used as a separator in the coin-type cells. The cell so prepared is static cell.

Cell Testing:

The cells are tested using Constant Current Charge and Constant Current Discharge techniques.

The cells are tested between 0.5V to 2V. Battery cyclers from Neware are used to test these cells. When charging the cell, soluble redox ions in the eutectic electrolyte diffuse to the cathode and deposit in the form of solid metal oxide on the carbon black, while metal ions get electrodeposited on the Zinc anode. During discharge of the cell, the uniform layer of as-deposited metal oxide on the cathode is dissolved back to soluble redox ions in eutectic electrolyte and on anode as deposited metal is dissolved back to metal ions in eutectic electrolyte.

Typical voltage-time profiles are done using BioLogic VPM3 at a constant charge and discharge current of 0.5 mA/cm$^2$ with a capacity limit of 0.5 mAh/cm$^2$.

Experiment 1

Cells are prepared using the above method and tested using constant current techniques as described above. The eutectic electrolyte composition used in the cell contains eutectic electrolyte of Example 1.

Cyclic voltammograms of a cell. To determine the eutectic electrolyte of Example 1 as a potential use case for cell. Two electrode CVs of a cell at a scan rate of 5 mV/s from 1 V to 2.2. These data show the primarily faradaic response of the eutectic electrolyte and are consistent with the galvanic charge discharge profiles.

As shown in FIG. 1, The CV curve in the eutectic electrolyte exhibits a similar oxidation and reduction peak for Manganese Oxide deposition and dissolution. A pair of well-defined peaks could be observed at a potential range of 1-2.2 V. The oxidation peak at 1.7V is attributed to the electrochemical deposition of Manganese Oxide from eutectic electrolyte and the corresponding reduction peak at 1.35V is regarded as the dissolution of Manganese Oxide to $Mn^{2+}$.

Experiment 2

Cyclic voltammograms of a full cell. To determine the eutectic electrolyte of Example 2 as a potential use case for Zinc based battery. Two electrode CVs of a cell at a scan rate of 5 mV/s from 1V to 2.

Cells are prepared using the above method and tested using constant current techniques as described above. The eutectic electrolyte composition is used in the cell contains eutectic electrolyte of Example 2.

Figure 2:
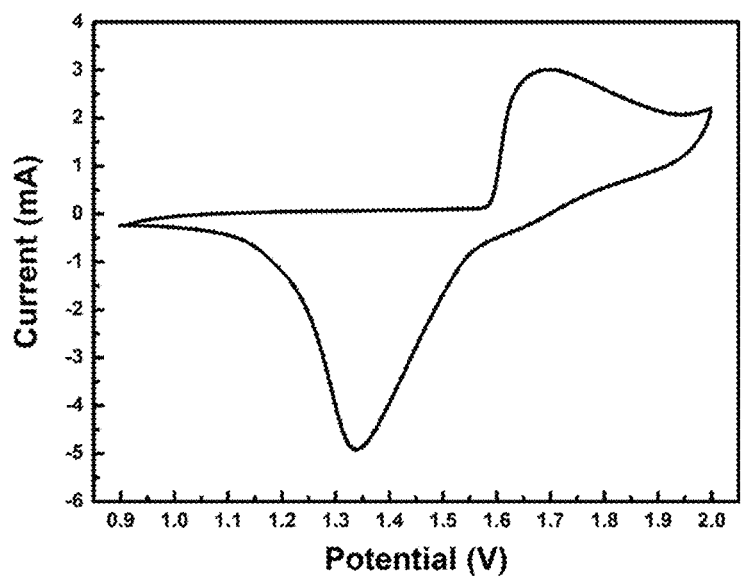
FIG. 2: Displays the cyclic voltammetry curve of eutectic electrolyte of Example 2 on a full cell carbon/carbon symmetrical cell at a scan rate of 5 mV/s. The oxidation peak at 1.68V is attributed to the electrochemical deposition of Manganese Oxide from soluble Manganese Acetate and the corresponding reduction peak at 1.35V is regarded as the dissolution of Manganese Oxide to Manganese Acetate in eutectic electrolyte.

As shown in FIG. 2, the CV curve in the eutectic electrolyte exhibits a similar oxidation and reduction peak for Manganese Oxide deposition and dissolution. A pair of well-defined peaks could be observed at a potential range of 1-2V. The oxidation peak at 1.67V is attributed to the electrochemical deposition of Manganese Oxide from eutectic electrolyte and the corresponding reduction peak at 1.35V is regarded as the dissolution of Manganese Oxide to $Mn^{2+}$.

Experiment 3

To determine the long-term cyclability and rate performance of Zn/Zn symmetric cell in eutectic electrolyte of Example 1.

Cells are prepared using the above method and tested using constant current techniques as described above. The eutectic electrolyte composition used in the cell contains eutectic electrolyte of Example 2.

Figure 3:
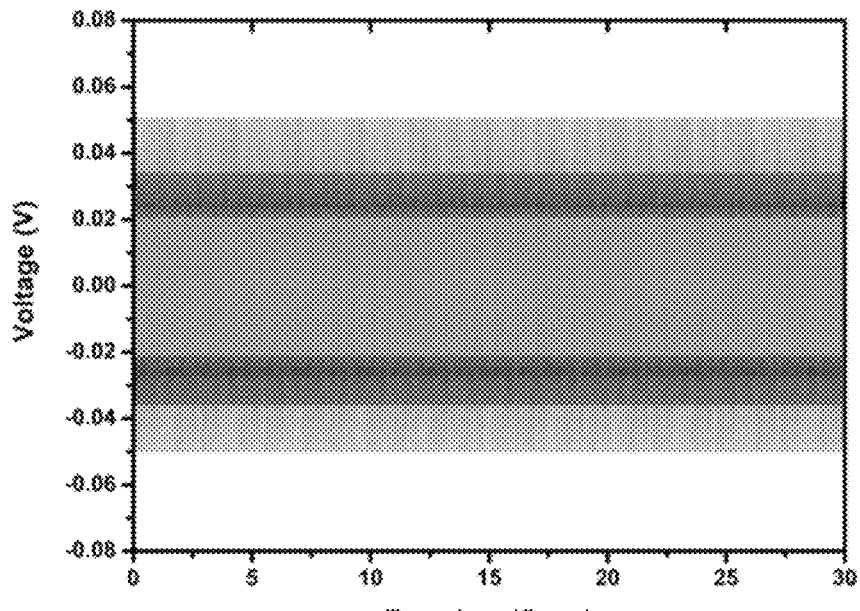
FIG. 3 is a voltage-time graph depicting electrochemical stability and reversibility of eutectic electrolyte of Example 1 in a symmetrical set-up of Zn/Zn at a current of 0.5 $mA/cm^2$ and a charge/discharge cut-off capacity of 0.5 $mAh/cm^2$.

The results of voltage-time electrochemical stability tests of the Zn/Zn symmetrical cell are shown in FIG. 3. The eutectic electrolyte of Example 1 displays greater stability over a period of 30 days. Indicating no dendrite formation and good reversibility.

Experiment 4

To determine the effect of temperature on the electrolytic conductivity of solutions and its viscosity.

Cells are prepared using the above method and tested using constant current techniques as described above. The eutectic electrolyte composition is used in this test contains eutectic electrolyte of Example 1.

Ionic conductivity of eutectic electrolyte of Example 1. It is shown that, over the measured temperature range of 10 to 60° C., the eutectic electrolyte of Example 1 provides higher ionic conductivity, especially at elevated temperatures that increased from 10.73 to 51.98 mS/cm. This may be ascribed to as temperature increases, the energy gained by the molecules in the eutectic electrolyte medium increases along with decrease in viscosity (goes from 90 mPa·s at 10° C. to 20 mPa·s at 60° C.) and hence the ions are in a higher energy state which will lead to the mobility increases and hence the conductivity increases in eutectic solvent. The, eutectic electrolyte of Example 1 is thermally stable, and no decomposition products are found.

The effect of temperature on the ionic conductivity and viscosity of the eutectic electrolyte of Example 1 examined, is detailed in Table 1 below:

| Temp (C.) | Conductivity (mS/cm) | Viscosity (mPa · s) |
| --- | --- | --- |
| 10 | 10.73 | 90 |
| 20 | 25.33 | 50 |
| 25 | 28.63 | 42 |
| 30 | 34.72 | 38 |
| 35 | 38.19 | 33 |
| 40 | 41.02 | 30 |
| 50 | 48.89 | 27 |
| 60 | 51.98 | 20 |

Figure 4:
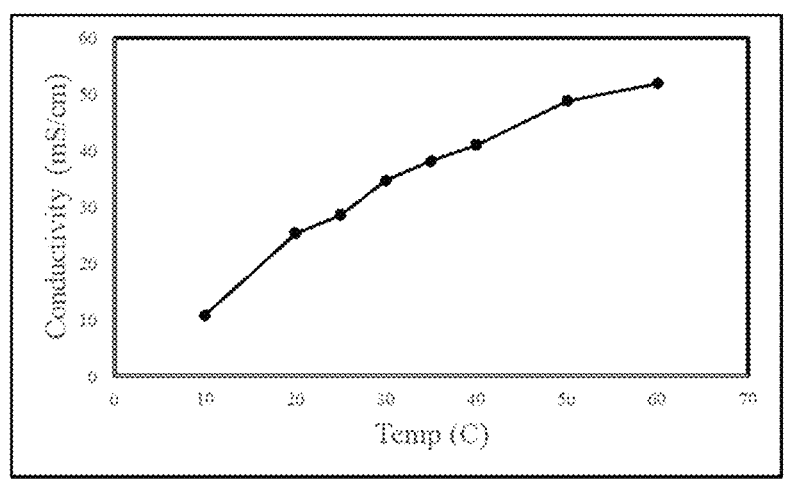
FIG. 4 is a graph depicting ionic conductivity of the electrolytes as a function of the temperature for the eutectic electrolyte of Example 1.

FIG. 4 represents graph of ionic conductivity of the eutectic electrolyte of Example 1 as a function of the temperature.

Experiment 5

To determine the effect of temperature on the electrolytic conductivity of solutions and its viscosity.

Cells are prepared using the above method and tested using constant current techniques as described above. The eutectic electrolyte composition used in this test contains eutectic electrolyte of Example 2.

Ionic conductivity of eutectic electrolyte of Example 2. It is shown that, over the measured temperature range of 10 to 60° C., the eutectic electrolyte of Example 2 provides higher ionic conductivity, especially at elevated temperatures that increased from 3.2 to 43.45 mS/cm. This may be ascribed to as temperature increases, the energy gained by the molecules in the eutectic electrolyte medium increases along with decrease in viscosity (goes from 150 mPa·s at 10° C. to 35 mPa·s at 60° C.) and hence the ions are in a higher energy state which will lead to the mobility increases and hence the conductivity increases in Eutectic electrolyte. The eutectic electrolyte of Example 2 is thermally stable, and no decomposition products are found.

The effect of temperature on the ionic conductivity and viscosity of the eutectic electrolyte of Example 2 examined, is detailed in Table 2 below:

| Temp (C.) | Conductivity (mS/cm) | Viscosity (mPa · s) |
| --- | --- | --- |
| 10 | 3.2 | 150 |
| 20 | 12.98 | 80 |
| 25 | 18.22 | 72 |
| 30 | 22.43 | 64 |
| 35 | 27.83 | 56 |
| 40 | 31.87 | 48 |
| 50 | 37.99 | 40 |
| 60 | 43.45 | 35 |

Figure 5:
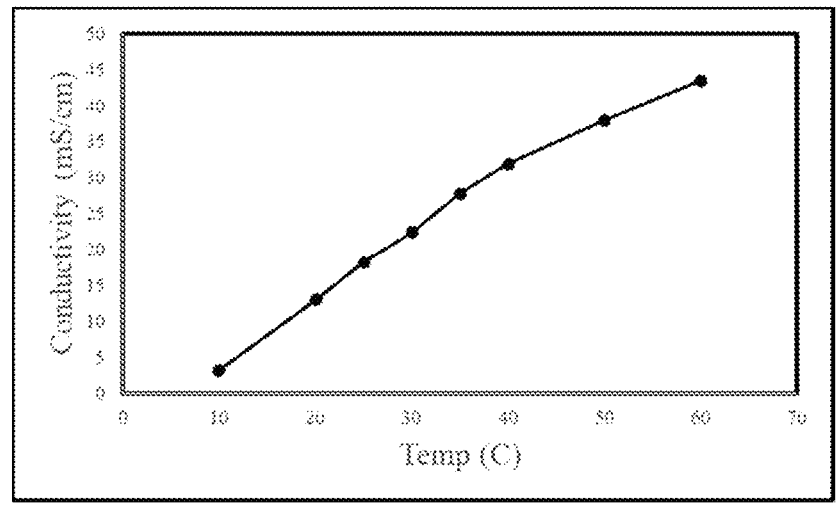
FIG. 5 is a graph depicting ionic conductivity of the electrolytes as a function of the temperature for the eutectic electrolyte of Example 2.

FIG. 5 shows Ionic conductivity of the eutectic electrolyte of Example 2 as a function of the temperature.

Experiment 6

To determine Cell performance in eutectic electrolyte of Example 1.

Cells are prepared using the above method and tested using constant current charge and discharge techniques as described above. The electrolyte composition used in the cell contains eutectic electrolyte of Example 1.

Figure 6:
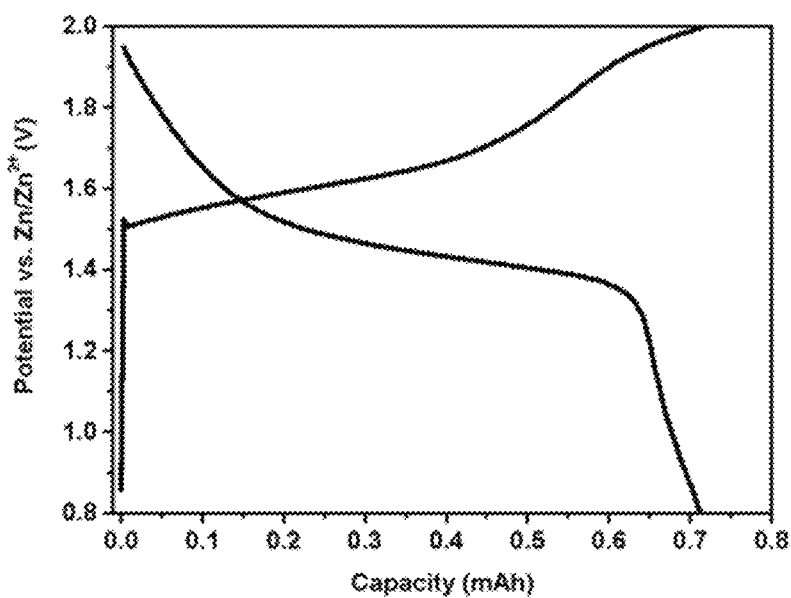
FIG. 6 is a graph depicting a typical charge-discharge profile of the cell at the current density of 0.35 ma.

As shown in FIG. 6, Charge/discharge curves show highly reversible electrochemical reactions within 0.5 to 2V. The average charge and discharge voltage plateau is 1.55 V and 1.4 V respectively indicates low polarization. Highly reversible electrochemical reaction gives both coulombic efficiency and energy efficiency of around >99% and >90% respectively.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A eutectic electrolyte for zinc based rechargeable redox static energy storage devices, the eutectic electrolyte comprising:
    one or more inorganic transition metal salt(s) of zinc selected from the group consisting of Zinc Chloride, Zinc Acetate, Zinc Methanesulfonate, Zinc Sulphate, Zinc triflate;
    one or more salt(s) of metal(s) selected from the group consisting of manganese, nickel, titanium and copper metal with sulphate anions, methane sulfonate anions, halide anions including chloride, bromide, organic salts of transition metal ions with anions selected from the group consisting of acetate, oxalates, formates, phosphinates, lactate, malate, citrate, benzoate, and ascorbate;
    one or more Metal hydroxide(s) selected from the group consisting of sodium hydroxide, potassium hydroxide, aluminum hydroxide, zinc hydroxide, calcium hydroxide, cesium hydroxide, magnesium hydroxide, and iron hydroxide;
    a eutectic solvent comprising one or more derivative(s) of methanesulfonic acid selected from its salts with metal ions selected from the group consisting of manganese, zinc, cerium, nickel, titanium, copper, sodium, potassium, and calcium;
    one or more ammonium salt(s) having general formula $NH_4X$, where X is selected from the group consisting of chloride, methanesulfonate, acetate, sulphate, triflate, and trimethanesulfonate; and
    one or more hydrogen bond donor(s) selected from the group consisting of urea, thiourea, glycerol, oxalic acid, acetic acid, ethylene glycol, acetamide, benzamide, adipic acid, benzoic acid, and citric acid;
    wherein the molar ratio of the one or more derivative(s) of methanesulfonic acid, the one or more ammonium salt(s), and the one or more hydrogen bond donor(s) is in the range 0.5-3:2-7:8-13.

2. The eutectic electrolyte of claim 1, wherein the eutectic electrolyte has pH ranging from 5 to 7.

3. The eutectic electrolyte of claim 1, wherein the eutectic electrolyte has ionic conductivity ranging between 1 to 55 mS/cm.

4. The eutectic electrolyte of claim 1, wherein the eutectic electrolyte has viscosity ranging between 10 to 200 mPa·s.

* * * * *